United States Patent [19]
Hall et al.

[11] Patent Number: 5,363,851
[45] Date of Patent: Nov. 15, 1994

[54] ULTRASOUND COLOR FLOW EXTENDED VELOCITY ESTIMATION

[75] Inventors: Anne L. Hall, New Berlin, Wis.; Richard B. Bernardi, Strafford, Pa.

[73] Assignee: General Electric Company, Milwaukee, Wis.

[21] Appl. No.: 158,139

[22] Filed: Nov. 26, 1993

[51] Int. Cl.$^5$ ............................................. A61B 8/00
[52] U.S. Cl. ......................... 128/661.09; 128/661.08; 73/861.25
[58] Field of Search ....................... 128/661.07, 661.08, 128/661.09, 661.10, 662.02, 660.05; 73/861.25

[56] References Cited

U.S. PATENT DOCUMENTS

| | | | |
|---|---|---|---|
| 5,190,044 | 3/1993 | Kawasaki et al. | 128/661.08 |
| 5,211,169 | 5/1993 | Freeland | 128/661.08 |
| 5,291,892 | 3/1994 | O'Donnell | 128/661.09 |

Primary Examiner—George Manuel
Attorney, Agent, or Firm—Dennis M. Flaherty; John H. Pilarski

[57] ABSTRACT

A multi-lag method for estimating both high and low velocities of blood flow from a single set of firings in situations where both high-velocity and low-velocity signals are of interest. A color flow processor uses multiple lags in the firing sequence. The normal lag of unity is used for high-velocity estimation; lags greater than unity are used for low-velocity estimation. A normal firing sequence is set up with a pulse repetition frequency that allows accurate velocity estimation of the highest flow velocity that the operator expects. This sequence yields data that is appropriately wall filtered, and a high-velocity estimate is made by correlation over adjacent firings, that is, firings 1 and 2, 2 and 3, 3 and 4, and so on, to the end of the packet, are respectively correlated. The same data is then used to provide a low-velocity estimate. The correlation is calculated between firings that are spaced by multiple units of the pulse repetition interval, e.g., by correlating firings 1 and 3, 2 and 4, 3 and 5, and so on.

20 Claims, 4 Drawing Sheets

ULTRASOUND COLOR FLOW EXTENDED VELOCITY ESTIMATION

FIELD OF THE INVENTION

This invention generally relates to ultrasound color flow Doppler imaging of fluid flow fields. In particular, the invention relates to a method and an apparatus for imaging blood flowing in the human body by detecting Doppler shifting of ultrasonic echoes reflected from the flowing blood.

BACKGROUND OF THE INVENTION

Measurement of blood flow in the heart and vessels using the Doppler effect is well known. Whereas the amplitude of the reflected waves is employed to produce black and white images of the tissues, the frequency shift of the reflected waves may be used to measure the velocity of reflecting scatterers from tissue or blood. Color flow images are produced by superimposing a color image of the velocity of moving material, such as blood, over the black and white anatomical image. The measured velocity of flow at each pixel determines its color.

Most ultrasound color flow systems determine blood velocity in the body by measuring the phase change caused by the Doppler shift of the returning backscattered ultrasound signal. This phase change is usually determined by firing multiple pulses in the same direction, and for each range cell, high pass filtering the data to remove static tissue components and correlating adjacent firings. The phase of the complex correlation function produces the mean velocity. This method has several limitations. The velocity sensitivity is primarily determined by the pulse repetition frequency (PRF). When imaging low flow, a low PRF is necessary to allow a measurable phase change to take place between firings. This is done at the expense of frame rate, since it takes longer to make each ultrasound image.

A conventional technique is to interleave firings from several directions, so that the effective PRF is lowered while the actual PRF remains high, allowing for acceptable frame rates to be maintained. The low-flow sensitivity inherent in the interleaving technique, however, is achieved at the expense of high-velocity resolution. If the phase change between effective firings is greater than plus or minus $\pi$, velocity ambiguities occur which cause the estimates to alias, yielding erroneous results.

A technique used in Doppler weather radar called staggered PRF is often proposed to alleviate the aliasing problem. A firing sequence involving several different long pulse repetition intervals is used, and the resulting estimates can be unfolded to allow velocity resolution in a range that exceeds the aliasing limits of both of the PRF intervals.

The staggered PRF method is difficult to implement in medical ultrasound applications because it is very difficult to design high-pass wall filters with the right characteristics for nonuniformly spaced data points. In order to obtain accurate mean velocity estimates, the filters must be linear in phase and have a uniform frequency sensitivity over the entire passband.

SUMMARY OF THE INVENTION

The present invention is a multi-lag method for estimating both high and low velocities of blood flow in situations where both high-velocity and low-velocity signals are of interest. In accordance with this multi-lag method, a color flow processor uses multiple lags in a conventional color flow firing sequence. The normal lag of unity is used for high-velocity estimation; lags greater than unity are used for low-velocity estimation. This multi-lag method is not the optimal method when only low-velocity flow is of interest, since its noise properties are worse than those of conventional interleaving methods, but it allows simultaneous imaging of slow- and fast-moving vascular flow.

In accordance with the method of the invention, a normal firing sequence is set up with a PRF that allows accurate velocity estimation of the highest flow velocity that the operator expects. This sequence yields data that is appropriately wall filtered, and a high-velocity estimate is made with a standard color flow velocity estimator over adjacent firings, that is, firings 1 and 2, 2 and 3, 3 and 4, and so on, to the end of the packet. The same data is then used to provide a low-velocity estimate. The data is wall filtered using possibly a different wall filter, and the velocity is estimated between firings that are spaced by multiple units of the pulse repetition interval. One can increase the low-flow sensitivity by calculating velocity estimates using firings 1 and 3, 2 and 4, 3 and 5, and so on. Using larger pulse repetition intervals would further increase the low-flow sensitivity.

The low-flow estimation used in the invention has one additional advantage over traditional interleaving. The velocity estimate is an average over the total time required to collect the data. For the interleaved case, the total time equals the number of firings times the effective, long pulse repetition interval, whereas in the method of the invention, the total time equals the number of firings times the short pulse repetition interval. This difference can be important in cases where the operator is interested in accurately measuring low-flow states in a dynamic system such as pulsatile flow in the carotid artery.

Experimental data indicated that using a low-flow wall filter in the short-lag estimate may be as effective as the multi-lag method when one can afford many firings per estimate. The long-lag estimate, however, is more accurate when only a limited number of firings can be made.

For each range cell, a decision is made whether the high-velocity estimate or the low-velocity estimate is to be used in converting the scan data into the display image.

DETAILED DESCRIPTION OF THE PREFERRED EMBODIMENTS

Figure 1:
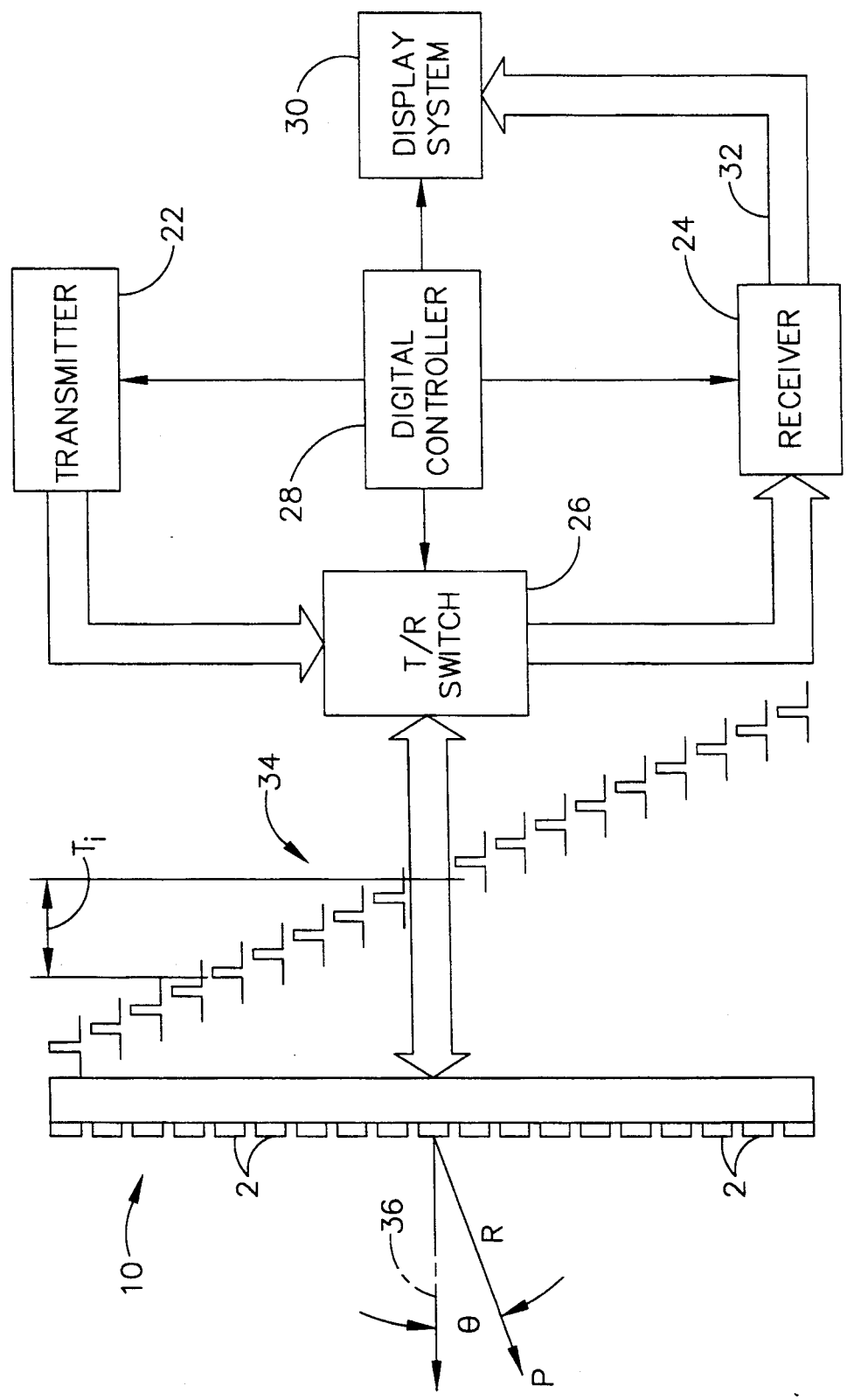
FIG. 1 is a block diagram of an ultrasonic imaging system which incorporates the present invention.

Referring to FIG. 1, the ultrasonic imaging system incorporating the invention includes a transducer array 10 comprised of a plurality of separately driven transducers 2, each of which produces a burst of ultrasonic energy when energized by a pulsed waveform produced by a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit position, transmitter 22 is gated ON momentarily to energize each transducer 2, switches 26 are then set to their receive position, and the subsequent echo signals produced by each transducer 2 are applied to receiver 24. The separate echo signals from each transducer 2 are combined in receiver 24 to produce a single echo signal which is used to produce a line in an image on a display system 30.

Transmitter 22 drives transducer array 10 such that the ultrasonic energy produced is directed, or steered, in a beam. To accomplish this, transmitter 22 imparts a time delay $T_i$ to the respective pulsed waveforms 34 that are applied to successive transducers 2. By adjusting the time delays $T_i$ appropriately in a conventional manner, the ultrasonic beam can be directed away from axis 36 by an angle $\theta$ and/or focussed at a fixed range R. A sector scan is performed by progressively changing the time delays $T_i$ in successive excitations. The angle $\theta$ is thus changed in increments to steer the transmitted beam in a succession of directions.

The echo signals produced by each burst of ultrasonic energy reflect from objects located at successive ranges along the ultrasonic beam. The echo signals are sensed separately by each transducer 2 and a sample of the magnitude of the echo signal at a particular point in time represents the amount of reflection occurring at a specific range. Due to the differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle $\theta$. Demodulation can occur either before or after the individual received signals are summed together.

Figure 2:
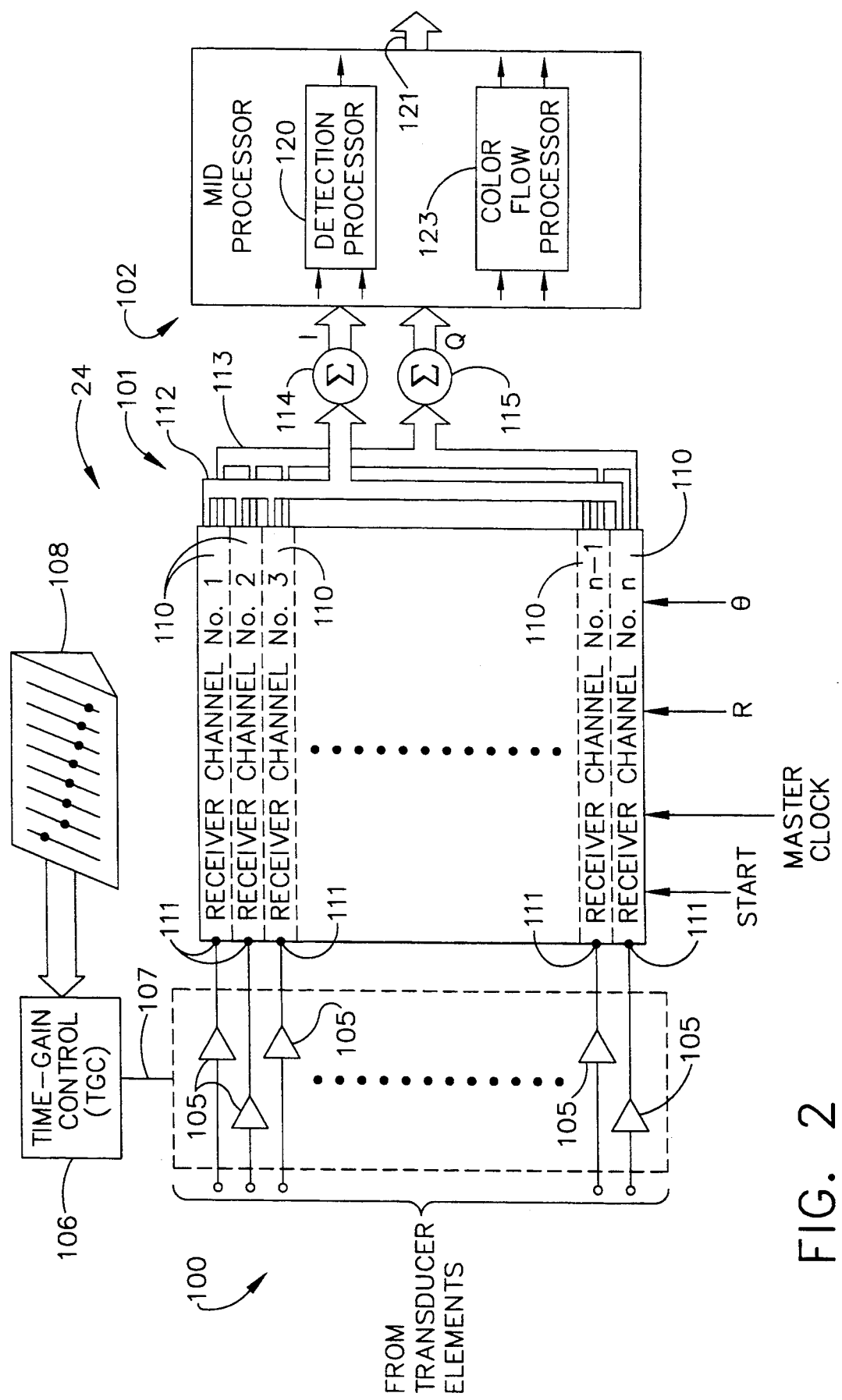
FIG. 2 is a block diagram of a receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the same delays ($T_i$) as the transmission delays described above. However, the time delay of each receiver channel is continuously changing during reception of the echo to provide dynamic focussing of the received beam at the range R from which the echo signal emanates.

Under direction of digital controller 28, receiver 24 provides delays during the scan such that steering of receiver 24 tracks the direction $\theta$ of the beam steered by transmitter 22 and samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 30 receives the series of data points produced by receiver 24 and converts the data into the desired image.

Referring to FIG. 2, receiver 24 comprises three sections: a time-gain control section 100, a receive beamforming section 101 and a mid-processor 102. Time-gain control (TGC) section 100 includes a respective amplifier 105 for each of the receiver channels 110 and a time-gain control circuit 106. The input of each amplifier 105 is connected to a respective one of transducers 2 to amplify the echo signal which it receives. The amount of amplification provided by amplifiers 105 is controlled through a control line 107 that is driven by TGC circuit 106, the latter being set by hand operation of potentiometers 108.

The receive beamforming section 101 of receiver 24 includes separate receiver channels 110. Each receiver channel 110 receives the analog echo signal from one of amplifiers 105 at an input 111. Each amplified signals is conveyed to a pair of quadrature detectors in the respective receiver channel, where the phases of the mixing reference frequency differ by 90°. Since this reference frequency is made identical to that of the transmitted pulses, the outputs from low-pass filter in the receiver channel become the complex Doppler frequencies that have been shifted by Doppler effects, and the pair of outputs also become complex signals (I and Q) with phases that differ by 90°. These signals are output as a stream of digitized output values on an I bus 112 and a Q bus 113. Each of these I and Q baseband signals represents a demodulated sample of the echo signal envelope at a specific range R. These samples have been delayed such that when they are summed at summing points 114 and 115 with the I and Q samples from each of the other receiver channels 110, the summed signals indicate the magnitude and phase of the echo signal reflected from a point P located at range R on the steered beam ($\theta$). Alternatively, the demodulation can be performed after the individual received signals are summed.

Midprocessor section 102 receives the beam samples from summing points 114 and 115. The I and Q values of each beam sample are signals representing the in-phase and quadrature components of the magnitude of the reflected sound from a point (R, $\theta$). A color flow processor 123 receives the I and Q values of each demodulated and focussed echo signal sample from summing points 114 and 115, and produces a flow value at the midprocessor output 121. This flow signal controls the red, green and blue display colors, and is applied to display system 30 (see FIG. 1) along with the magnitude M for the same point. The color indicated by this flow value is a function of the velocity and direction of flow, and possibly the flow variance or power, as measured by color flow processor 123.

Figure 3:
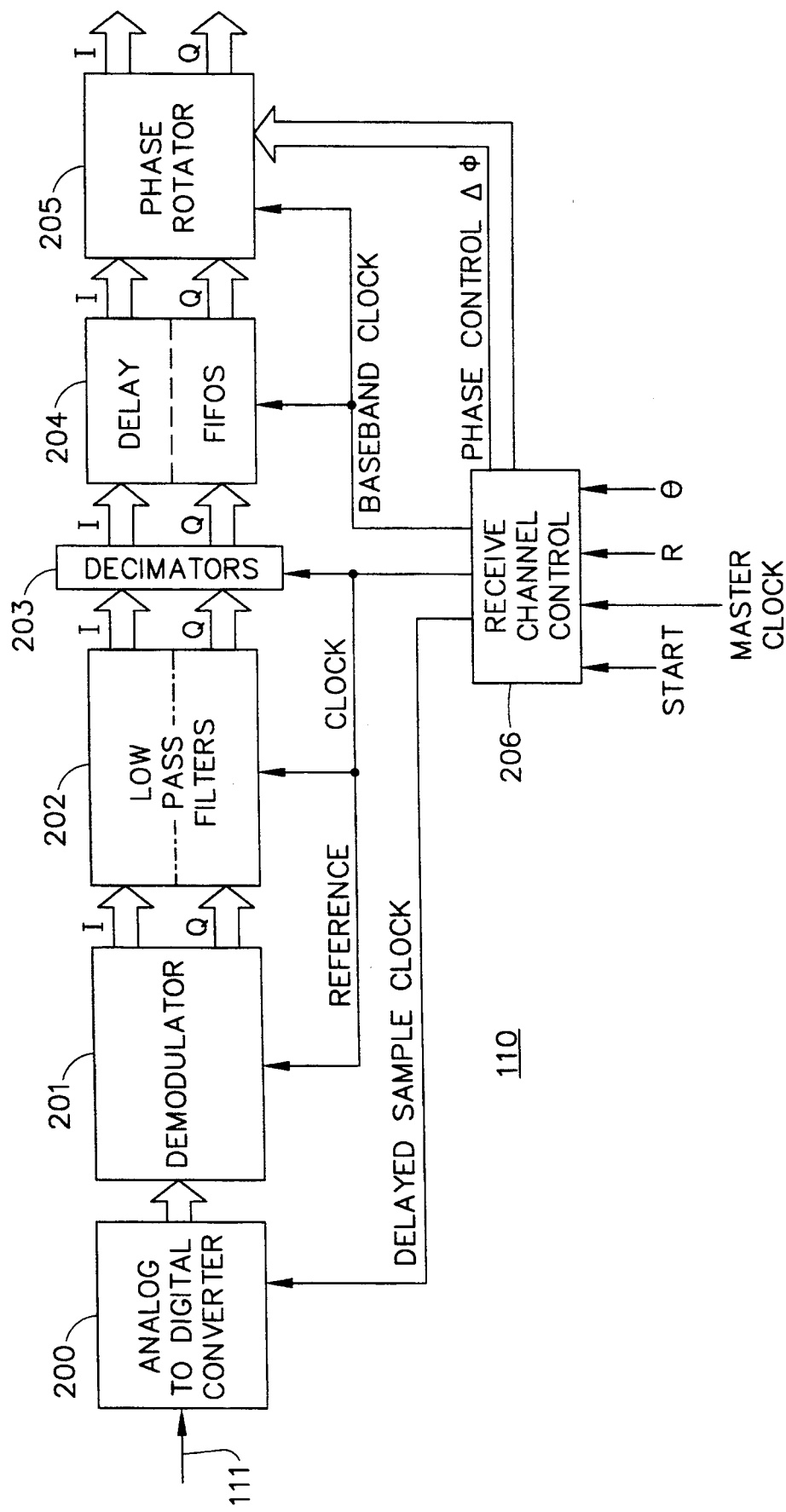
FIG. 3 is a block diagram of a receiver channel which forms part of the receiver of FIG. 2.

Referring to FIG. 3, each receiver channel is responsive to a START command, a master clock, and a beam angle signal ($\theta$) from digital controller 28 (FIG. 1) to perform the digital beamforming functions, which include: sampling the analog input signal 111 in an analog-to-digital converter (ADC) 200; demodulating the sampled signal in a demodulator 201; filtering out the high-frequency sum signals produced by demodulator 201 with low pass filters 202; possibly reducing the data rate in decimators 203; and time delaying and, if necessary, phase adjusting the resulting digital data stream in delay FIFOs (i.e., first-in/first-out memories) 204 and phase rotator 205. Elements 200-205 are controlled by a receive channel control 206 which produces the required clock and control signals in response to commands from digital controller 28 (FIG. 1).

The ADC 200 samples the analog signal at regular intervals. These samples are provided to demodulator 201, which mixes each sample with both a reference that is in-phase with the transmitted ultrasonic carrier, and with a reference in quadrature with the transmitted ultrasonic carrier. The low pass filters 202 are finite impulse response (FIR) filters tuned to pass the difference frequencies, but block the higher sum frequencies supplied by demodulator 201. The output signal of each low pass filter is a stream of digital values which indicate the magnitude of the I or Q component of the echo signal envelope.

The rate at which the demodulated I and Q components of the echo signal are sampled is reduced by decimators 203. The echo signal envelope represented by the demodulated and decimated digital samples is then delayed by delay FIFOs 204 and possibly phase adjusted by phase rotator 205 to provide the desired beam steering and beam focusing.

The color flow midprocessor 123 is used to provide a real-time two-dimensional image of blood velocity in the imaging plane. The blood velocity is calculated by measuring the phase shift from firing to firing at a specific range gate. Instead of measuring the Doppler spectrum at one range gate in the image as in traditional Doppler techniques, mean blood velocity from multiple vector positions and multiple range gates along each vector are calculated, and a two-dimensional image is made from this information.

Figure 4:
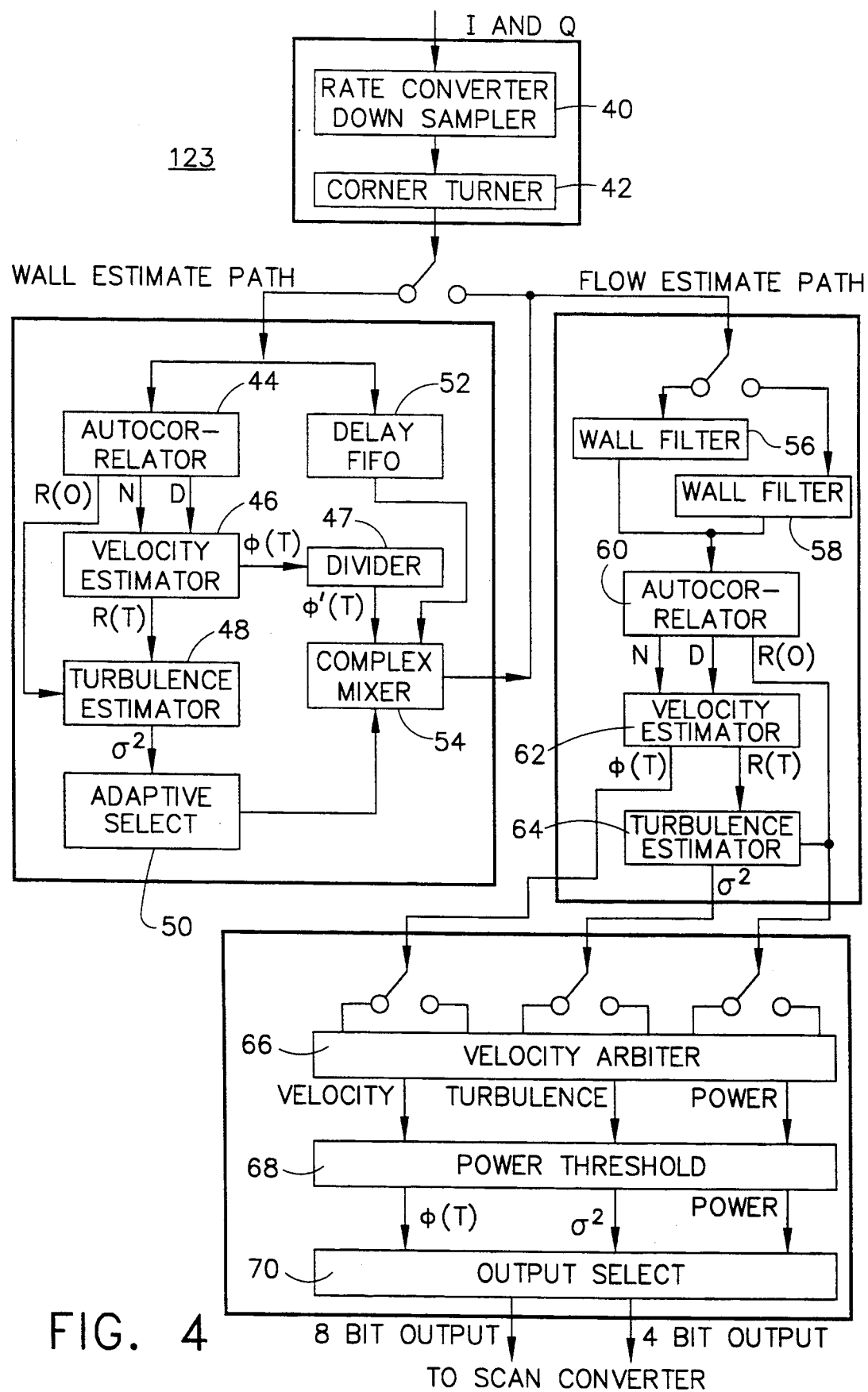
FIG. 4 is a schematic diagram of a color flow processor in accordance with the present invention, which forms part of the receiver of FIG. 2.

The color flow midprocessor 123 receives the summed left and right, complex I/Q data from the beamformer and processes it to calculate mean flow velocity, turbulence and power for all sample volumes within an operator-defined region. Referring to FIG. 4, the incoming data is rate converted and downsampled (40) such that the resulting number of data points is consistent with the output display resolution. The downsampled data is stored in a corner turner 42, whose purpose is to buffer data from multiple firings and output the data as vectors of points across firings at a given range cell.

The color flow processor has an adaptive mode and a nonadaptive mode. The adaptive mode will be primarily used for low-flow applications, and uses both the wall estimate path and the flow estimate path. The nonadaptive mode uses only the flow estimate path. The adaptive mode provides an estimate of the wall velocity and variance, which allows the system to adaptively vary the wall filter to match the characteristics of the wall signal. The wall estimate path includes autocorrelator 44, velocity estimator 46 and turbulence (variance) estimator 48; the flow estimate path similarly includes autocorrelator 60, velocity estimator 62 and turbulence (variance) estimator 64.

In accordance with the present invention, the color flow processor must be able to read one set of data out of corner turner 42 twice, in different sequences. The short-interval or unity-lag data is input into wall filter 58, which is an FIR filter designed to remove the static or nearly static components from the short-interval data. The wall filtered data is then input to an autocorrelator 60, which performs conventional autocorrelation processing. In conventional processing, the points are wall filtered in sequence and a term in the correlation sum is produced from every adjacent pair of firings, that is, firings 1 and 2, 2 and 3, 3 and 4, etc. The autocorrelation algorithm is used to estimate the mean Doppler shift and variance directly. The real and complex autocorrelation between data from the adjacent firings is calculated and summed. These values are traditionally called N and D and are determined in accordance with the equations:

$$N = \sum_{i=1}^{M-1} (I_i Q_{i+1} - I_{i+1} Q_i) \quad (1)$$

$$D = \sum_{i=1}^{M-1} (I_i I_{i+1} + Q_i Q_{i+1}) \quad (2)$$

where $I_i$ and $Q_i$ are the demodulated, basebanded input data for firing i, and M is the number of firings in the packet. The mean Doppler frequency in hertz is obtained from the phase of N and D and the pulse repetition interval T:

$$\bar{f} = \frac{1}{2\pi T} \Phi(T) \quad (3)$$

where $\Phi(T)$ is the phase of N and D:

$$\Phi(T) = \tan^{-1}\left[\frac{N}{D}\right] \quad (4)$$

The mean velocity can be calculated using the well-known Doppler equation:

$$\bar{v} = \frac{\bar{f}}{f_0} \frac{c}{2\cos\theta} \quad (5)$$

A time domain expression for turbulence can be written as a second-order series expansion of the variance of the mean Doppler frequency. The time domain representation involves calculating the zero- and one-lag autocorrelation powers, R(0) and R(T) respectively:

$$\sigma^2 = \frac{2}{(2\pi T)^2}\left[1 - \frac{|R(T)|}{R(0)}\right] \quad (6)$$

The exact autocorrelation functions are approximated by finite sums over the known data in the number of firings in a packet, and their power terms are given by:

$$|R(T)| = \sqrt{N^2 + D^2} \quad (7)$$

$$R(0) = \sum_{i=1}^{M-1} \frac{(I_i^2 + Q_i^2 + I_{i+1}^2 + Q_{i+1}^2)}{2} \quad (8)$$

This algorithm is implemented in the hardware and is the basis for the color flow processing. The calculated values for N and D are output by autocorrelator 60 to the velocity estimator 62. The velocity estimator computes R(T) and $\phi(T)$ in accordance with Eqs. (4) and (7). R(0) from autocorrelator 60 and R(T) from velocity estimator 62 are input to the turbulence estimator 64, which computes the variance $\sigma^2$ in accordance with Eq. (6). R(0), $\phi(T)$ and $\sigma^2$ are then input to power threshold detector 66.

The wall filtering and autocorrelation sum of the long-interval data are modified from the conventional practice. In the wall filter, for example, the data are filtered in groups, and some provision must be made to allow for the gap between groups. Likewise, in the autocorrelation sum, the sequence of points to use is not quite the same as in the short-interval case. Whereas in conventional processing, the points are wall filtered in sequence and a correlation term is produced from every pair, in the long-lag case, the data points are sorted differently. An eight-firing sequence processed with a 2:1 lag ratio is switched into wall filter 56 (having filtering characteristics different than those wall filter 58) in the order 1 3 5 6 2 4 6 8. Coming out of wall filter 56 would be the sequence 1' 3' 5' junk (the result of filtering the data points for firings 7 and 2, which should be disregarded in further processing) 2' 4' 6' and the autocorrelation would be done for 1' and 3' 3' and 5' 2' and 4' and finally 4' and 6'.

In accordance with the invention, wall filter 56 is used for the low-velocity estimate. The degradation in the number of data points into the autocorrelator with increasing filter tap length will probably limit this filter to one with a small number of coefficients. In contrast, a longer filter can be used for the high-velocity estimate.

The high- and low-velocity estimates are made sequentially and output to a switch which applies the high-velocity estimate to one input and the low-velocity estimate to another input of a velocity arbiter 66. The velocity arbiter incorporates decision logic for determining which estimate should be output to the scan converter.

Deciding whether to use the high-velocity or low-velocity estimate is relatively complicated. There are generally four valid velocity regions of interest: 1) a high-velocity region where the long-interval estimate aliases and the short-interval estimate should be used; 2) a middle region where both estimates produce reasonable results; 3) a low-velocity region where the wall filter on the short-interval data produces noise and/or biased results and the long-interval estimate should be used; and 4) a region where neither estimate is valid since there is no flow. The goal is to use the already available information (velocity, variance and color power) to logically decide which estimate is most accurate for each sample volume in issue. Experimental studies indicated that this decision could be made using the following algorithm:

IF high-velocity estimate × lag ratio > VELOCITY THRESHOLD AND high-velocity power > POWER THRESHOLD
THEN velocity = high-velocity estimate
ELSE velocity = low-velocity estimate
where VELOCITY THRESHOLD is a register storing an operator-selectable value for a velocity threshold to separate regions 1 from regions 2 and 3 where the low-velocity estimate is valid; and POWER THRESHOLD is a register storing an operator-selectable value for the power threshold.

The first test in the algorithm examines whether the low-velocity estimate is likely to be aliased; and the second test ensures that the high-velocity estimate (which is the one driving the decision) is not just noise. This differentiates estimates for region 1 from the other estimates. The above algorithm then uses the low-velocity estimate in regions 2, 3 and 4. A more complicated algorithm would attempt to also recognize the difference between regions 2 and 3 and average the two valid velocity estimates in region 2 for better statistical performance.

The output from the velocity arbiter 66, with its associated power and variance, are sent to the power threshold detector 68, which eliminates estimates that fall in region 4.

Another method which can be used only works if the lag ratio is 2:1. This velocity arbiter logic looks for a sign difference between the high-velocity and low-velocity estimates, and uses the high-velocity estimate if the low-velocity estimate appears to be an aliased copy; otherwise the low-velocity estimate is used. This method obviously only allows one phase wraparound, so it only works for the 2:1 lag ratio.

Since the filtering characteristics of wall filters 56 and 58 are different, the high and low estimates are not going to look exactly like scaled versions of each other (where the scale factor is the lag ratio). For this reason, it is advantageous to use a register for VELOCITY THRESHOLD in the above decision logic.

The velocity, variance and power signals from power threshold detector 68 are output to the output mode select block 70, which determines the output to the scan converter as determined by the operator. The signal $\phi(T)$ forms the flow velocity component of the flow signal produced by color flow processor 123 and is applied to the least significant digit address inputs on a chrominance control look-up table (LUT) which resides in the display system 30 (FIG. 1). Each addressable memory in the chrominance control LUT stores 24 bits of data which are read out on a bus. For each pixel in the image to be produced, eight of these bits control the intensity of red, eight bits indicate the intensity of green, and eight bits control the intensity of blue. These bit patterns are preselected such that as the flow velocity changes in direction or magnitude, the color of the pixel at the location (R, $\theta$) is changed. For example, flow toward the transducer may be indicated as red and flow away from the transducer may be indicated as blue. The faster the flow, the brighter the color.

To indicate the nature of the flowing reflectors, a turbulence estimator 64 computes the variance using the R(0) output from autocorrelator 60 and the R(T) output from velocity estimator 62. Turbulence estimator 64 produces an output signal $\sigma^2$ which indicates the frequency spread of the flow signal component of the baseband echo signal. This value is indicative of flow turbulence, since laminar flow has a very narrow range of velocities, while turbulent flow is a mixture of many velocities. The turbulence value $\sigma^2$ is supplied from color flow processor 123 as another component of the flow signal on bus 121, and it is applied to the most significant digit address terminals on the chrominance control LUT. The turbulence value $\sigma^2$ completes the address from which chrominance control data will be read out of the chrominance control LUT. Alternatively, power can be used as either the least significant or most significant address bits.

The multi-lag mode can be used with the low-velocity flow adaptive mode. Only the long-lag method would be used to generate the wall velocity estimate, and this would need to be scaled for the short interval. There is no wall filter issue in the wall estimate path, but the autocorrelator would still need to know which terms are useful ( one should not correlate between firings 7 and 2 in the example above).

In the adaptive mode the wall velocity, power and variance (turbulence) are calculated at every range cell by autocorrelator 44, velocity estimator 46 and turbulence estimator 48 in the wall estimate path. The wall velocity $\phi(T)$, which is a function of PRF, is then divided by the relevant lag ratio in divider 47. The wall variance $\sigma^2$ is processed by an adaptive mode selector 50, which determines whether the wall velocity divided by the lag ratio ($\phi'(T)$) should be mixed in complex mixer 54 with the I and Q input data held in delay FIFO 52. If the nonadaptive mode should be used, a zero wall velocity will be mixed with the I and Q input data. If the adaptive mode should be used, the $\phi'(T)$ output of divider 47 will be mixed with the I and Q input data, which results in frequency-shifted outputs I' and Q'.

Depending on the lag, the correctly sorted I' and Q' values for the shifted echo signal are applied to the inputs of the appropriate high-pass FIR wall filter 56, each of which have stop bands centered at DC and predetermined filter characteristics. The widths of the stop bands are determined by filter coefficients which are supplied by a filter coefficient look-up table (LUT) (not shown).

The foregoing preferred embodiments have been disclosed for the purpose of illustration. Variations and modifications will be readily apparent to those skilled in the art of ultrasound color flow velocity estimation. All such variations and modifications are intended to be encompassed by the claims set forth hereinafter.

We claim:

1. A method for estimating the velocity of flow containing a cloud of ultrasound scatterers, comprising the steps of:
    firing a plurality of ultrasound pressure wave beams in succession at a predetermined pulse repetition frequency, all of said plurality of ultrasound beams being directed along a path of propagation through said flow;
    detecting the ultrasound pressure wave reflected by said scatterers at a predetermined range for each of said firings and converting said pressure waves into a plurality of echo signals, said echo signals being the result of scattering in a range cell at said predetermined range along said path of propagation;
    converting said plurality of echo signals into basebanded data for each of said firings;
    determining a first predetermined order by correlating a first predetermined lay with said firings, selecting said basebanded data in said first predetermined order;
    computing the velocity estimate with said basebanded data in said first predetermined order to form a high-velocity estimate;
    determining a second predetermined order by correlating a second predetermined lag with said firings, selecting said basebanded data in said second predetermined order, said second predetermined lag being greater than said first predetermined lag;
    computing the velocity estimate with said basebanded data in said second predetermined order to form a low-velocity estimate; and
    deciding which one of said high-velocity estimate and said low-velocity estimate to adopt as the estimated velocity of ultrasound scatterers in said predetermined range cell.

2. The method as defined in claim 1, wherein said basebanded data in said first predetermined order is wall filtered in accordance with a first set of filter coefficients prior to computing the velocity estimate, and said basebanded data in said second predetermined order is wall filtered in accordance with a second set of filter coefficients prior to computing the velocity estimate, said second set of filter coefficients being different than said first set of filter coefficients.

3. The method as defined in claim 2, further comprising the steps of:
    estimating the wall velocity using said basebanded data in said second predetermined order;
    dividing said estimated wall velocity by said second predetermined lag to form a scaled estimated wall velocity;
    mixing said basebanded data in said first predetermined order with said scaled estimated wall velocity;
    using said mixed basebanded data and scaled estimated wall velocity to adaptively wall filter said basebanded data in said first predetermined order;
    mixing said basebanded data in said second predetermined order with said scaled estimated wall velocity; and
    using said mixed basebanded data and scaled estimated wall velocity to adaptively wall filter said basebanded data in said second predetermined order.

4. The method as defined in claim 1, wherein said step of deciding which estimate to adopt is performed in accordance with the following algorithm:
    IF high-velocity estimate×lag ratio>VELOCITY THRESHOLD AND high-velocity power>- POWER THRESHOLD
    THEN velocity=high-velocity estimate
    ELSE velocity=low-velocity estimate
where VELOCITY THRESHOLD is the flow velocity threshold and POWER THRESHOLD is the power threshold.

5. The method as defined in claim 1, wherein said first predetermined lag equals one pulse repetition interval and said second predetermined lag equals a multiple of said pulse repetition interval.

6. The method as defined in claim 5, wherein said second predetermined lag equals two of said pulse repetition interval.

7. The method as defined in claim 6, wherein said step of deciding which estimate to adopt comprises the step of detecting a sign difference between said high-velocity estimate and said low-velocity estimate.

8. A system for estimating the velocity of flow containing a cloud of ultrasound pressure wave scatterers, comprising:
    means for firing a plurality of ultrasound beams in succession at a predetermined pulse repetition frequency, all of said plurality of ultrasound beams being directed along a path of propagation through said flow;
    means for detecting the ultrasound pressure wave reflected by said scatterers at a predetermined range for each of said firings and converting said pressure waves into a plurality of echo signals, said echo signals being the result of scattering in a range cell at said predetermined range along said path of propagation;
    means for converting said plurality of echo signals into basebanded data for each of said firings;
    means for determining a first predetermined order by correlating a first predetermined lag with said firings, and determining a second predetermined order by correlating a second predetermined lag with said firings, means for selecting said basebanded data in first and second predetermined orders, said second predetermined lag being greater than said first predetermined lag;

means for computing the velocity estimate with said basebanded data in said first predetermined order to form a high-velocity estimate and the velocity estimate with said basebanded data in said second predetermined order to form a low-velocity estimate; and means for deciding which one of said high-velocity estimate and said low-velocity estimate to adopt as the estimated velocity of ultrasound scatterers in said predetermined range cell.

9. The system as defined in claim 8, further comprising:

first wall filter means for wall filtering said basebanded data in said first predetermined order in accordance with a first set of filter coefficients;

second wall filter means for wall filtering said basebanded data in said second predetermined order in accordance with a second set of filter coefficients, said second set of filter coefficients being different than said first set of filter coefficients; and means for alternately switching the output of said selecting means to either said first wall filter means or said second wall filter means, each of said first and second wall filter means having an output coupled to an input of said means for computing the velocity estimate.

10. The system as defined in claim 9, further comprising:

means for estimating the wall velocity using said basebanded data in said second predetermined order;

means for dividing said estimated wall velocity by said second predetermined lag to form a scaled estimated wall velocity;

means for mixing said basebanded data in said first predetermined order with said scaled estimated wall velocity;

means for adaptively wall filtering said basebanded data in said first predetermined order using said mixed basebanded data and scaled estimated wall velocity;

mixing said basebanded data in said second predetermined order with said scaled estimated wall velocity; and means for adaptively wall filtering said basebanded data in said second predetermined order using said mixed basebanded data and scaled estimated wall velocity.

11. The system as defined in claim 8, wherein said deciding means comprises logic for performing the following algorithm:

IF high-velocity estimate×lag ratio>VELOCITY THRESHOLD AND high-velocity power>-POWER THRESHOLD THEN velocity=high-velocity estimate
ELSE velocity=low-velocity estimate where VELOCITY THRESHOLD is the flow velocity threshold and POWER THRESHOLD is the power threshold.

12. The system as defined in claim 8, wherein said first predetermined lag equals one pulse repetition interval and said second predetermined lag equals a multiple of said pulse repetition interval.

13. The system as defined in claim 12, wherein said second predetermined lag equals two of said pulse repetition interval.

14. The system as defined in claim 13, wherein said deciding means comprises means for detecting a sign difference between said high-velocity estimate and said low-velocity estimate.

15. An ultrasound imaging system for imaging flow containing a cloud of ultrasound pressure wave scatterers, comprising:

means for firing a plurality of ultrasound beams in succession at a predetermined pulse repetition frequency, all of said plurality of ultrasound beams being directed along a path of propagation through said flow;

means for detecting the ultrasound pressure waves reflected by said scatterers at a predetermined range for each of said firings and converting said pressure waves into a plurality of echo signals, said echo signals being the result of scattering in a range cell at said predetermined range along said path of propagation;

means for converting said echo signals into a plurality of digital values corresponding to said plurality of firings;

means for determining a first predetermined order by correlating a first predetermined lag with said firings, and determining a second predetermined order by correlating a second predetermined lag with said firings, means for selecting said digital values in first and second predetermined orders, said second predetermined lag being greater than said first predetermined lag;

means for computing the autocorrelation function correlating said digital values in said first predetermined order to form a high-velocity estimate and the autocorrelation function correlating said sampled digital values in said second predetermined order to form a low-velocity estimate;

means for deciding which one of said high-velocity estimate and said low-velocity estimate to adopt as the estimated velocity of ultrasound scatterers in said predetermined range cell; and means for displaying an image made up of pixels having a property which varies as a function of said adopted estimated velocity.

16. The ultrasound imaging system as defined in claim 15, further comprising:

first wall filter means for wall filtering said digital values in said first predetermined order in accordance with a first set of filter coefficients;

second wall filter means for wall filtering said digital values in said second predetermined order in accordance with a second set of filter coefficients, said second set of filter coefficients being different than said first set of filter coefficients; and means for alternately switching the output of said selecting means to either said first wall filter means or said second wall filter means, each of said first and second wall filter means having an output coupled to an input of said means for computing the autocorrelation function.

17. The ultrasound imaging system as defined in claim 15, wherein said deciding means comprises logic for performing the following algorithm:

IF high-velocity estimate×lag ratio>VELOCITY THRESHOLD AND high-velocity power>-POWER THRESHOLD THEN velocity=high-velocity estimate
ELSE velocity=low-velocity estimate
where VELOCITY THRESHOLD is the flow velocity threshold and POWER THRESHOLD is the power threshold.

18. The ultrasound imaging system as defined in claim 17, further comprising:
   means for estimating the wall velocity using said basebanded data in said second predetermined order;
   means for dividing said estimated wall velocity by said second predetermined lag to form a scaled estimated wall velocity;
   means for mixing said basebanded data in said first predetermined order with said scaled estimated wall velocity;
   means for adaptively wall filtering said basebanded data in said first predetermined order using said mixed basebanded data and scaled estimated wall velocity;
   mixing said basebanded data in said second predetermined order with said scaled estimated wall velocity; and
   means for adaptively wall filtering said basebanded data in said second predetermined order using said mixed basebanded data and scaled estimated wall velocity.

19. The ultrasound imaging system as defined in claim 8, wherein said first predetermined lag equals one pulse repetition interval and said second predetermined lag equals a multiple of said pulse repetition interval.

20. The ultrasound imaging system as defined in claim 19, wherein said second predetermined lag equals two of said pulse repetition interval, and said deciding means comprises means for detecting a sign difference between said high-velocity estimate and said low-velocity estimate.

* * * * *